Figure 3:
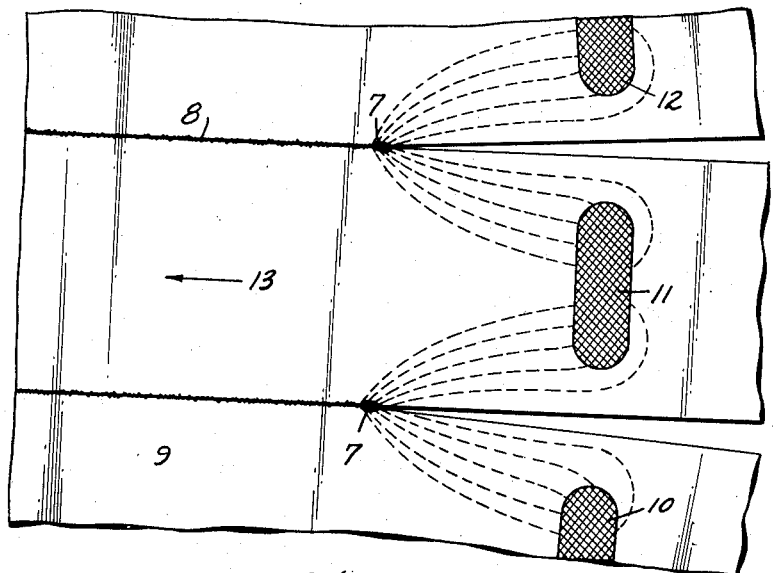

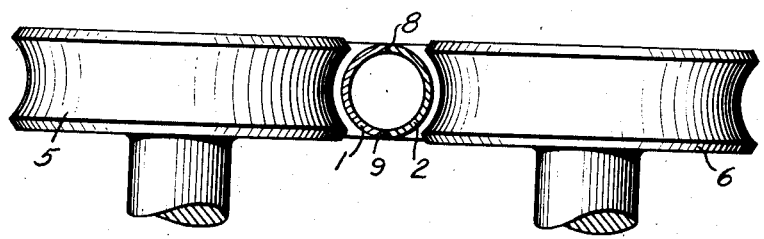
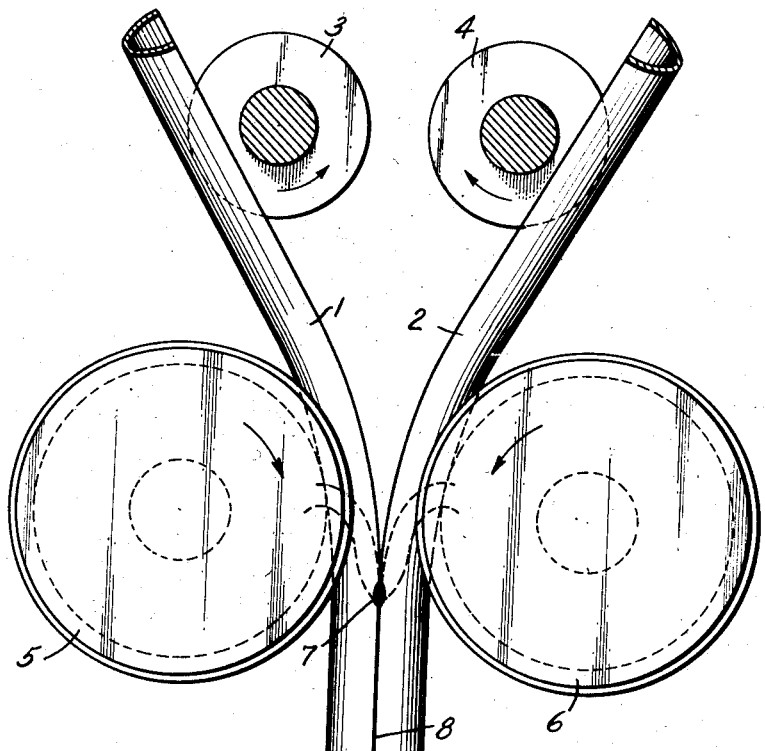

Aug. 4, 1953  A. WÖGERBAUER  2,647,981
ELECTRICAL BUTT SEAM WELDING OR CUTTING PROCESS
AND APPARATUS FOR CARRYING OUT SAID PROCESS
Filed Nov. 9, 1948  5 Sheets-Sheet 2

Inventor
ALFRED WÖGERBAUER
By Churchill, Rich, Weymouth & Engel
Attorneys

Aug. 4, 1953  A. WÖGERBAUER  2,647,981
ELECTRICAL BUTT SEAM WELDING OR CUTTING PROCESS
AND APPARATUS FOR CARRYING OUT SAID PROCESS
Filed Nov. 9, 1948
5 Sheets-Sheet 3

Inventor
ALFRED WÖGERBAUER
By Churchill, Rich, Weymouth & Engel
Attorneys

Aug. 4, 1953     A. WÖGERBAUER     2,647,981
ELECTRICAL BUTT SEAM WELDING OR CUTTING PROCESS
AND APPARATUS FOR CARRYING OUT SAID PROCESS
Filed Nov. 9, 1948     5 Sheets-Sheet 4
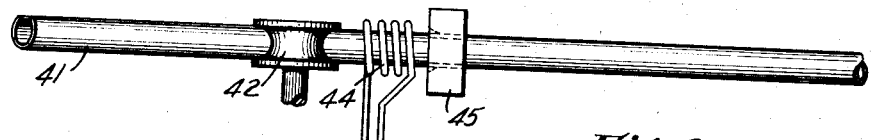
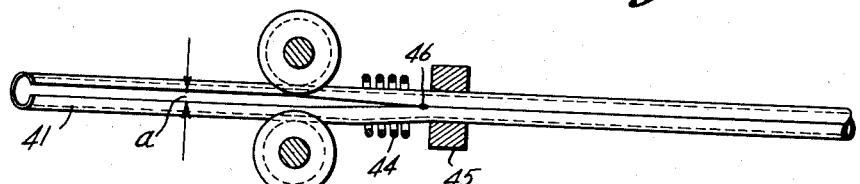
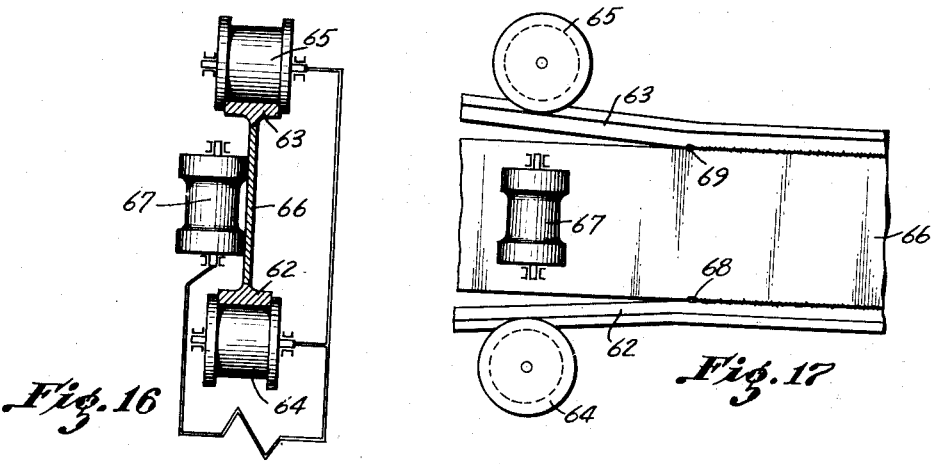
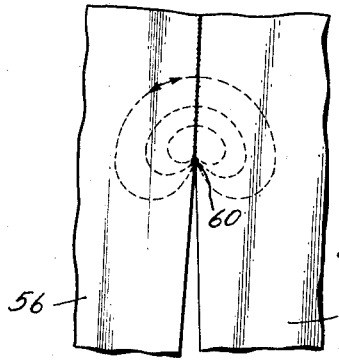
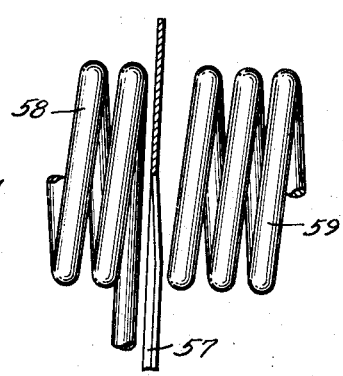
Inventor
ALFRED WÖGERBAUER
By Churchill, Rich, Weymouth & Engel
Attorneys Aug. 4, 1953  A. WÖGERBAUER  2,647,981
ELECTRICAL BUTT SEAM WELDING OR CUTTING PROCESS
AND APPARATUS FOR CARRYING OUT SAID PROCESS
Filed Nov. 9, 1948  5 Sheets-Sheet 5

Inventor
ALFRED WÖGERBAUER
By Churchill, Rich, Weymouth & Engel
Attorneys

Patented Aug. 4, 1953

2,647,981

UNITED STATES PATENT OFFICE 2,647,981

ELECTRICAL BUTT SEAM WELDING OR CUTTING PROCESS AND APPARATUS FOR CARRYING OUT SAID PROCESS

Alfred Wögerbauer, Zipf, Oberosterreich, Austria

Application November 9, 1948, Serial No. 59,108
In Austria December 8, 1947

9 Claims. (Cl. 219—6)

The invention relates to an electrical butt seam welding or cutting process and to an apparatus for carrying out said process. In the field of incandescent welding the butt seam welding has hitherto been employed for the manufacture of tubes with a circular cross section only. It was equally limited to carbon steel with a carbon content of less than 0.2%, and could not be extended to alloyed steels or other metals. The reason therefor resides in the fact that the concentration of current at the weld during the welding procedure is too small enabling a joint with a specially adapted material only and showing even then merely small strength values.

The flash welding process does not show the drawbacks of the butt seam welding, but is applicable to work pieces consisting of almost any metal or alloy, and also enables the joining of dissimilar materials. However, the flash welding process always uniformly comprises the total cross section to be welded, and thereby narrow limits for the length of the seams and for the shape of the welding material do result, thus e. g. the thickness of the sheet must not be less than about 1.5 mm., a value depending on the accuracy of the guide of the dies, and being even exceeded, if devices of the customary kind are used.

The object of the invention is to combine in a welding process the qualitative advantages of flash welding with the quantitative merits of continuous butt seam welding, and the invention aims at economically manufacturing butt seams of a high quality on tubes, profiled work pieces, and sheets. It is especially adapted for the manufacture of circular and profiled tubes, as well as for joining formed and unformed sheets. The invention enables, however, likewise electrically to cut work pieces, and thereby ensures advantages over autogenous cutting and mechanical shearing.

The invention is based upon the knowledge that in current carrying conductors abnormally high densities of the current are brought about in those places where the current, in consequence of a sharp deflection of the conductor, suffers an almost complete reversion of its direction. If e. g. in a sheet a somewhat longer cut-out in the form of an acute-angled notch is made, and if high current is supplied in such a way that it is forced to flow round said cut-out, a hole is burnt out at the point of said cut-out. This phenomenon may be utilized, according to the invention, in the same manner for the seam welding of two work pieces, as well as for the cutting of one work piece into two parts. It consists substantially in that the current is conducted through the parts of the work piece preferably placed against each other at an acute angle around at least one notch-like cut-out formed by said parts, whereby the heating to flashing off temperature ensues at the point of the cut-out, and that said parts are moved for the welding in the direction towards the point of the angle, and for the cutting in the opposite direction, whereby the angular position of said parts is maintained. In this manner there is obtained in the first case, with a speed suitably chosen and under suitable pressure, a continuous welding seam in its result similar to the flash welding. Contrary to the point and seam welding the movement of the work piece or of the parts to be welded is, however, according to the invention, an essential characteristic of the procedure, and thereby only the angular position of the edges of the work piece up to the place of contact, as well as the melting process are continuously maintained. The term cut-out is used in its broad sense to include slits, recesses and the like formed by the work pieces to be joined or provided in connection with a work piece to be cut.

The density of current at the flash off point and thus an effect similar to the flash welding may be intensified by the use of currents of a higher frequency. The flashed off material, including the oxides, is, in consequence of the welding pressure towards three sides, squeezed out of the seam so that a joint of a high quality is achieved. The superposition of an inductively produced current of a higher frequency upon a current of a lower frequency supplied by means of electrodes is suitably used in such cases where the melting point of the oxide layer lies essentially above the melting point of the fundamental material, like e. g. with $Al_2O_3$ (2050° C.) as opposed to Al (658° C.).

During the cutting particularly of flat work pieces, like sheets, said work pieces are to be provided for starting the flashing off procedure with an acute-angled notch-like cut-out, along both edges of which being turned towards each other the path of the current is effected. If after the supply of the welding current the flashing off starts at the point of the cut-out, the point-like flash off moves on at a great speed, if, at the same time, the divergent parts of the work pieces are mechanically moved away from each other.

With the butt seam welding process according to the invention for the manufacture of tubes and profiles the parts of the tubes and profiles to be welded are conducted convergently towards each other until a pressure contact of their edges is effected, and the welding current is conducted either directly by means of roller electrodes or inductively in such a way that it flows in a looping-like course through the convergent parts of the work pieces and their point of contact.

In the first case the parts of the work pieces convergently conveyed through guide rollers or spreaders to the roller electrodes, e. g. both halves of a tube, are pressed upon each other at their point of contact by the pressure effecting the forming of said parts e. g. to a tube when entering the electrode rollers.

If the production of welding current is to be brought about in the work piece by induction, according to the invention an induction coil surrounds the tube or the halves of the tube at the point where the edges of the tube, which are to be welded and which are convergently guided towards each other, meet under pressure.

If welding of flat sheets is to be carried out, the welding current is produced by means of induction coils arranged coaxially on both sides of the point of contact of the sheets convergently guided towards each other, said current flowing through the convergent edges of the sheets and through the place of contact of said edges at the point of the acute-angled cut-out formed by said edges.

During the manufacture of bends or helical or spiral tubes it is necessary to convey to the weld the external one of both halves of the tube with a somewhat greater curvature and a somewhat increased speed than the internal half of the tube, the latter for the reason that the speed of the edges which are to be contacted may be equal.

The simultaneous welding of two tubes according to the invention may be suitably carried out by means of an apparatus the two pairs of roller electrodes of which and their axles are forming the secondary winding of a welding transformer, said winding being closed by both welding bodies.

Figure 8:
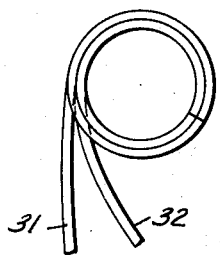
Figure 7:
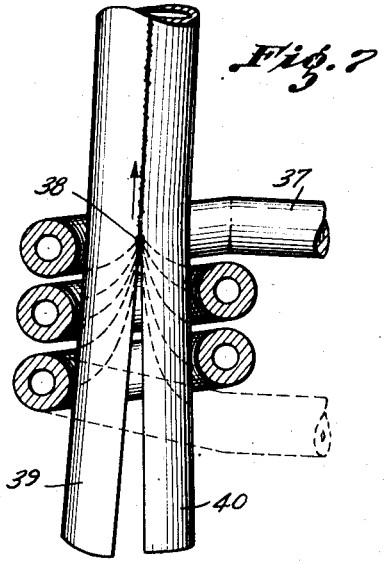
Figure 18:
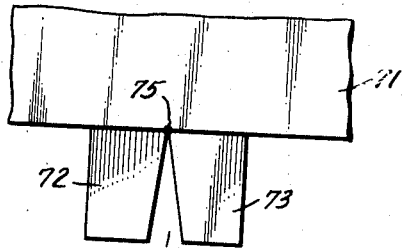
Figure 4:
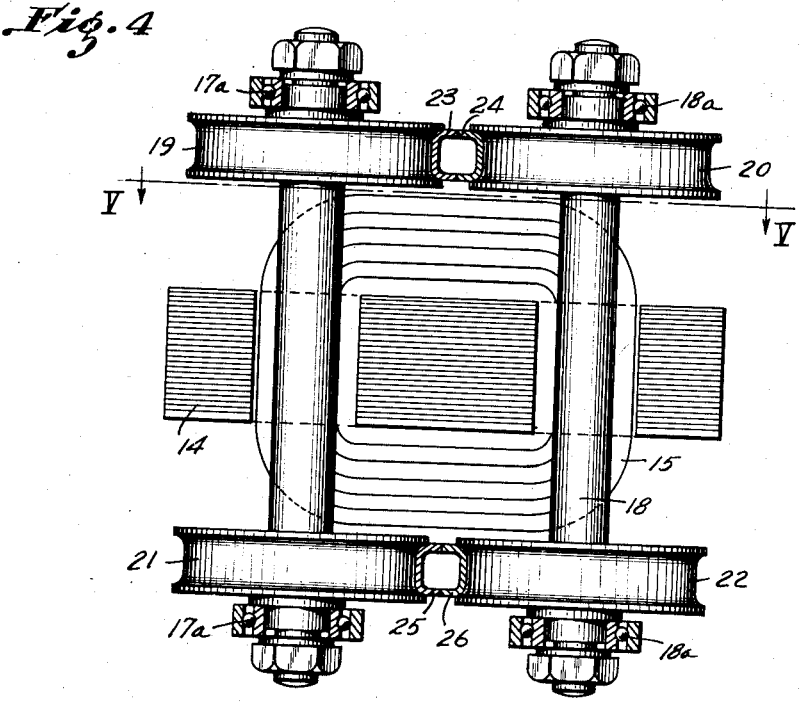
Figures 5, 6:
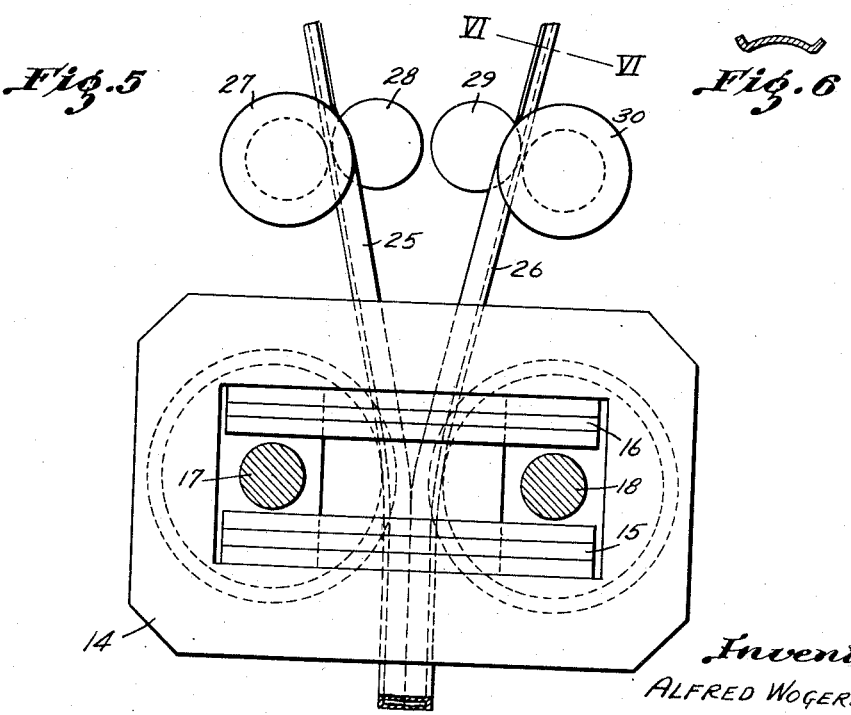
Figure 12:
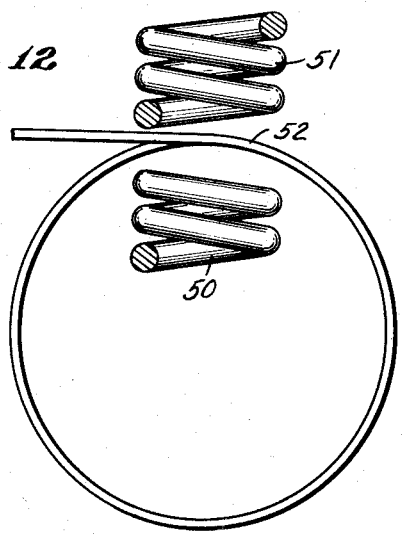
Figure 11:
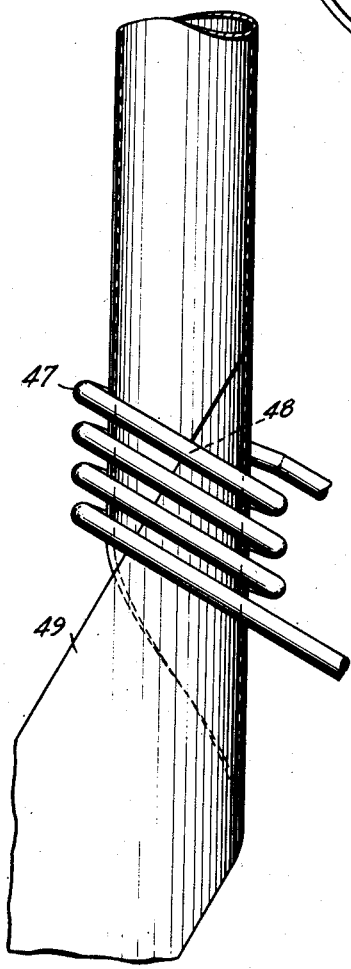
Figure 13:
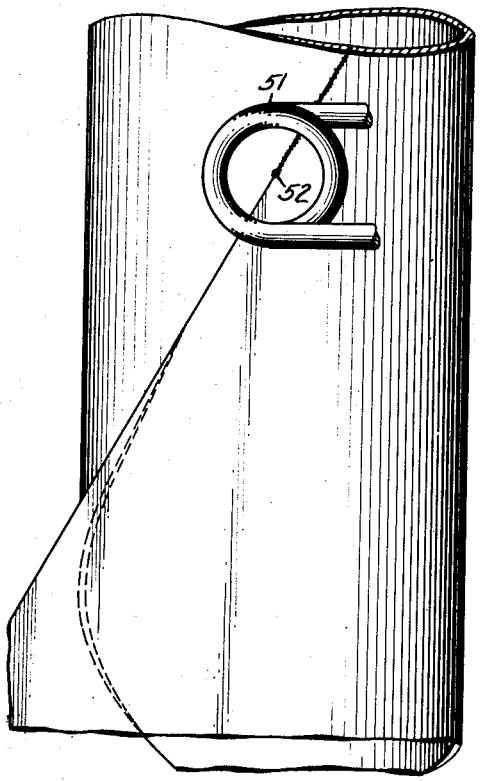

Some embodiments of welding arrangements according to the invention are schematically illustrated, by way of example, in the drawings, in which Figs. 1 and 2 show a welding device for the manufacture of a tube with a circular cross section in front view and top view, respectively, Fig. 3 illustrates the course of the current between the bearing surfaces of the electrodes in two welds of a tube section, Figs. 4 and 5 show a welding device for simultaneously welding two tubes with a square cross section in front view and in section along the line V—V of Fig. 4, respectively, Fig. 6 is a section on line VI—VI of Fig. 5, Fig. 7 is a top view of a welding device for an inductive supply of current to the tube, Fig. 8 a top view of a spiral tube formed by two semi-tubes, Figs. 9 and 10 a welding device with an inductive supply of current for a tube with a circular cross section formed from one band, in side view and top view, respectively, Figs. 11, 12, and 13 welding devices with an inductive supply of current for a tube formed by being helically wound up, in top view and front view, respectively, Figs. 14, 15 a top view and side view, respectively, of a device for welding flat sheets, Figs. 16, 17 a welding device for the manufacture of a double T girder, in front view and top view, respectively, and Fig. 18 a work piece to be electrically cut, which is provided with projections for the supply of current.

Like reference characters denote like parts in the several figures of the drawings.

The technical progress of the invention is above all to be seen in an economical manufacture of butt seams of a quality hitherto not attainable. The extreme concentration of heat in a narrowly limited region effects with a small expenditure of current a cleaning of the welding seam, as it is otherwise attained solely with flash welding. The possibility of a use of well conductive metals, like aluminum and copper, as well as of metals with a particularly troublesome layer of oxide, like aluminium, chromium steels and aluminium steels, constitutes another significant progress.

The scaling of work pieces is no hinderance for employing the welding process according to the invention with an inductive supply of current. It is therefore, as with a supply of current through electrode rollers, not required to make bright the surfaces, through which the current is supplied to the work piece.

According to Figs. 1 and 2 there is used for the manufacture of a tube with a circular cross section a semi-finished material consisting of two semi-tubes 1 and 2, said material being produced in a known manner from bands. After passing two guide rollers or spreaders 3 and 4 the semi-tubes run over the electrode rollers 5 and 6, and the seam edges of the semi-tubes meet a distance apart from the current supplying areas of the electrode rollers at the flash off point or weld 7, so that between the convergent edges of the semi-tubes a notch-like slit is formed and the current flows in a looping-like course (indicated by dotted lines) around the pointed part of the slit. The welding pressure is produced in this case by the deflection of the semi-tubes on entering the roller electrodes. The distance of the point of contact 7 of the semi-tubes from the points of contact between the electrode rollers and the semi-tubes may be adjusted to its optimal extent by a change of the diameter of the rollers and of the distance of the rollers, the latter suitably by means of a compound slide rest. Removing the burrs off the welding seams 8 and 9, as well as any other finishing operation may be carried out in known manner.

Fig. 3 shows the concentration of current at the welds 7 of the sections of a tube illustrated in flat form. The hatched surfaces 10, 11, and 12 represent the contact surfaces of the electrodes. From said surfaces the current (dotted lines) flows with a growing concentration towards the flash off points 7. It would be obvious to suppose that an essential part of the current also flows through the already finished welded seams 8 and 9. This is, however, not the case, as in consequence of the advance of the halves of the tube in the direction of the arrow 13 continually new parts of the edge are contacted, and the still hot welding seam shows a high resistance, and furthermore, with the use of alternating current, particularly of a higher frequency; said current is directed to the edge, and the way over the flash off point 7 is the shortest for the current to take. The density of the current in this place and the temperature prevailing there may be forced up to such an extent that the flashed off and squeezed out metal particles burn in the oxygen of the air. This is recognisable by the sparking and by the noise known in flash welding.

The welding device according to Figs. 4 and 5 is provided for simultaneously welding two tubes and comprises a shell core 14, around the middle portion of which the primary windings 15 and 16 are arranged in such a way that the axles 17 and 18 passing through the openings of the core form parts of the secondary winding for the welding current. The secondary circuit of that transformer is closed through the rollers 19, 20, 21, 22 of the electrodes and the welding material between these rollers. The bearings 17a, 18a of the axles 17 and 18 are electrically insulated against their support and are arranged outside the rollers and thus kept currentless. The forming of the semi-tubes 23, 24, 25 and 26 is effected by two sets of forming rollers, the last pairs 27, 28 and 29, 30 of which serve simultaneously as spreaders. Fig. 6 shows a section through the semi-tube before the last forming steps. Figs. 4 to 6 make it evident that the process according to the invention is not limited to tubes with a circular cross section.

A device for welding a tube by means of inductive heating is shown in Fig. 7. The course of the secondary welding current is indicated by dotted lines and is produced in the semi-tubes 39, 40 by the induction coil 37, said current being concentrated at the contacting point 38. The welding pressure may be attained by suitably positioning the forming rollers (not represented), which cause also the movement of the semi-tubes.

For the manufacture of bends and of helical or spiral tubes both semi-tubes 31, 32 are, as indicated in Fig. 8, conveyed to the weld at differing curvature, and the external semi-tube 31 is advanced faster than the internal tube 32. The supply of current may be effected, in the manner described, directly by means of roller electrodes, or inductively. By said process the filling, heating, bending, and the discharge of the tube required during the customary manufacture of such bent tubes are avoided.

The invention is furthermore qualified for improving the butt seam welding of circular tubes having a circular cross section and merely one longitudinal seam. In Figs. 9 and 10 an arrangement adapted therefor is illustrated by way of example. The tube 41 is formed in the usual way by a set of several pairs of rollers from one band. The last pair of rollers 42 does not, however, close up the tube completely, but leaves open a slit a. The welding current is produced in that tube by the induction coil 44 in the manner already indicated. Welding current may also, additionally or alternately, be conducted by means of the forming rollers 42 to the flash off point 46. A drawing die 45 closes the tube and produces the welding pressure and the upsetting way required. With an appropriate choice of the dimensions and distances of rollers and drawing die the welding current is concentrated at the point 46, so that the flashing off effect ensues. The advantages of the process according to the invention already stated, like increase of the strength of the welding seam and simplification of the means of production, are increased by the improvement of a simultaneous hot calibration. In order to attain at the weld a precise joint of the tube edges to be welded the halves of the tube or the tube onesidedly split may, with all the embodiments for the manufacture of tubes, be conducted to the weld through a mandrel corresponding to the diameter of the tube. In any case the precision of the outline of the cross section of the manufactured tube may be increased by drawing that tube in the manner indicated through a drawing die directly after the welding.

The welding by means of current inductively supplied to the weld is likewise successfully applicable in the case the tube is manufactured by helically winding up a band. Contrary to the welding of a straight, axially parallel seam as shown in Figs. 9 and 10, the coil 47 according to Fig. 11, because of the oblique position of the seam with regard to the axis of the tube, is arranged around the weld 48 preferably in such a way that the axis 49 of that coil runs parallel to the tangent of the screw line of the seam in the weld, and thus the individual turns of the coil are in an approximately vertical position to the winding seam.

For the welding of tubes with a wider diameter the use of two induction coils 50, 51 (Figs. 12, 13) arranged on both sides of the weld 52 is suitable, because of the space available inside the tube, the axes of these coils being vertical to the axis of the tube and cutting the tubular mantle near the weld (compare also Fig. 15).

The invention may likewise be applied to the butt seam welding of flat sheets. While the carrying out of the said welding with a direct supply of current may be taken from the illustration of Fig. 3, the arrangement for the welding with an inductive supply of current differs from that for the tube welding. With the latter the axes of the inductive coil and of the tube are lying in a common straight line, and the magnetic field is passing in the direction of the welding seam and the welding current is passing essentially rectangularly thereto. For the welding of plane surfaces or sheets (Figs. 14, 15), however, the axes of the induction coils are lying rectangularly to the plane of the sheet and to the welding seam, and are cutting said welding seam in the flash off point 60 or not far therefrom. The magnetic field passes through the welding material at a right angle, and the welding current encircles the weld in the plane of the sheet. At the contacting point of the free edges of the sheet the current is again concentrated. Figs. 14 and 15 show the arrangement and the course of the current in a schematical illustration. The sheets 56 and 57 to be welded are lying between the induction coils 58 and 59, and the current indicated by a dotted line is induced in said sheets by said coils.

In order to produce the welding pressure the sheets are fixed in such a way that they overlap a little or the edges of the sheets are somewhat turned up. At the weld the seam is pressed by suitable means, like hard metal slide pieces or rollers, in the level of the sheet, thereby bringing about the welding pressure required.

Figs. 16 and 17 show the application of the invention to the manufacture of profiles. The problem of producing profiles like sectional work pieces, such as girders of an equal strength over their length with an increasing and a decreasing height of the web, may be solved just like the manufacture of work pieces having flanges and webs of different material. Contrary to rolled profiles the height of the webs is practically unlimited. With the direct supply of current illustrated in Figs. 16 and 17 the welding current is flowing from the transformer 61 to the welding material. The rollers 64 and 65 contacting the flanges 62 and 63, respectively, of a T-section iron are connected in parallel. The electrode roller 67 running upon the web 66 closes the secondary circuit through the welding material. Both welds 68 and 69 are connected in parallel.

An embodiment of a cutting device according to the invention is shown by way of example in Fig. 18. The sheet to be cut is either notched at the cutting point or, instead of providing the sheet with a notch-like cut-out, it is also possible to fix two projecting pieces 72, 73 at the edge of the sheet 71, the adjacent edges of said pieces forming an acute angle 74. The current supplied through the projections 72, 73 is flowing around the point 75 of the cut-out situated at the edge of the sheet and causes the sheet to flash off in this place. According to the automatic advance of the flash off the sheet parts separated are suitably divergently spaced apart, so that a predetermined cutting line may be observed. The particular advantages of said cutting process consist in the great cutting speed attainable, and in the cleanness of the cutting edges. Since the cutting process is distinguished from the welding process substantially merely by the reverse direction of movement of the work piece treated, the devices described in connection with the welding process may be applied accordingly to the cutting process.

The main field of employing the butt seam welding process according to the invention comprises the manufacture of tubes for gas and water supplies, of boiler and high-pressure tubes, of profiled tubes for the structural building, and of open profiles. For joining plane sheets the process is especially suited in those cases where the flash welding is not applicable, as with long seams. Special modes of application furthermore arise in the field of light and of economic building.

While the invention has been shown in the particular embodiment described it is not limited thereto, as modifications thereof may be made without departing from the scope of the appended claims.

I claim:

1. A continuous electric butt-seam welding process for manufacturing tubes, which comprises providing at least two longitudinal parts capable of forming a tube when put together, convergently conveying and forcing said parts toward each other by moving said parts by current conducting means until said parts contact so as to form at least two open seam gaps extending from the points of contact of said parts, and to press said parts together at said points of contact, supplying welding current to said parts by the mentioned current conducting means, and causing said current to flow in a loop-like course around said seam gaps and through said points of contact.

2. Apparatus for continuous electric butt-seam welding, comprising stationarily arranged means for convergently conveying toward each other, into contact at least two longitudinal parts capable of forming a tube when put together, and adapted to provide at least two seam gaps extending from the points of contact of said parts, means for drawing said parts along said stationary conveying means for forcing said parts toward each other, and pressing said parts together for effecting the welding pressure required at said points of contact and for supplying current to said parts at a distance from said points of contact to cause said current to flow in a loop-like course around all said seam gaps and through all said points of contact, said drawing and pressing means comprising electrode rollers in conductive contact with said longitudinal parts at a distance from said points of contact of said parts, and constituting also in part said conveying means.

3. Apparatus for continuous electric butt-seam welding, comprising stationarily arranged means for convergently conveying toward each other into contact at least two longitudinal parts capable of forming a tube when put together, and adapted to provide at least two seam gaps extending from the points of contact of said parts, means for drawing said parts along said stationary conveying means for forcing said parts toward each other, and pressing said parts together for effecting the welding pressure required at said points of contact and for supplying current to said parts at a distance from said points of contact to cause said current to flow in a loop-like course around all said seam gaps and through all said points of contact, said drawing and pressing means comprising electrode rollers in conductive contact with said longitudinal parts at a distance from said points of contact of said parts, and constituting also in part said conveying means, the said conductive contact being at non-contacting portions of said longitudinal parts whereby the flow of current between said rollers is along a path which is sharply angular in the vicinity of the contacting points of the longitudinal parts.

4. A continuous electric butt-seam welding process for manufacturing tubes, which comprises providing at least two longitudinal parts capable of forming a tube when put together, convergently moving said parts toward each other at an angle, bending said parts by means of supports until their edges are contacting, whereby in the points of contact said edges are pressed together in consequence of the bending procedure, thus bringing about the welding pressure required, supplying current to said parts on such places, that said current is conducted along said edges, which at these places are still at a distance from each other, and around the points of contact, for the purpose of effecting the fusion of said edges.

5. Apparatus for continuous electric butt-seam welding, comprising stationarily arranged means for convergently guiding at least two longitudinal parts capable of forming a tube when put together toward each other at an angle, means for drawing said parts along said stationarily arranged means and for bending in such a manner said parts until their edges are contacting, that said edges are present together for bringing about the welding pressure required, said last mentioned means also for supplying current to said parts on such places, that said current is conducted along said edges, which at these places are still at a distance from each other, and around the points of contact, for the purpose of effecting the fusion of said edges.

6. Apparatus for continuous electric butt-seam welding, comprising stationarily arranged means for convergently guiding at least two longitudinal parts capable of forming a tube when put together toward each other at an angle, electrode rollers for drawing said parts along said stationarily arranged means and for bending in such a manner said parts until their edges are contacting that said edges are pressed together for bringing about the welding pressure required, said electrode rollers also for supplying current to said parts on such places, that said current is conducted along said edges, which at these places are still a distance from each other, and around the points of contact, for the purpose of effecting the fusion of said edges, the axis of each of said electrode rollers being arranged substantially parallel to an imaginary plane through the two neighbouring seams energized by said electrode roller.

7. Apparatus for continuous electric butt-seam welding, comprising at least two spreading rollers for convergently guiding two longitudinal parts capable of forming a tube when put together toward each other at an angle, electrode rollers for drawing said parts along said stationarily arranged means and for bending in such a manner said parts until their edges are contacting that said edges are pressed together for bringing about the welding pressure required, said electrode rollers also for supplying current to said parts on such places, that said current is conducted along said edges, which at these places are still at a distance from each other, and around the points of contact, for the purpose of effecting the fusion of said edges, the axis of each of said spreading and of said electrode rollers being arranged substantially parallel to the imaginary plane through the seams.

8. A continuous electric butt-seam welding process for sheet metals, which comprises providing at least two longitudinal sheet parts capable of being welded one with another, convergently moving said parts toward each other at an angle, bending said parts by means of supports until their edges are contacting, whereby in the points of contact said edges are pressed together in consequence of the bending procedure, thus bringing about the welding pressure required, supplying current to said parts on such places, that said current is conducted along said edges, which at these places are still at a distance from each other, and around the points of contact, for the purpose of effecting the fusion of said edges.

9. Apparatus for continuous electric butt-seam welding, of sheet metals, comprising stationarily arranged means for convergently guiding at least two longitudinal sheet parts capable of being welded one with another at an angle, means for drawing said parts along said stationarily arranged means and for bending in such a manner said parts until their edges are contacting that said edges are pressed together for bringing about the welding pressure required, said last mentioned means also for supplying current to said parts on such places, that said current is conducted along said edges, which at these places are still at a distance from each other, and around the points of contact, for the purpose of effecting the fusion of said edges.

ALFRED WÖGERBAUER.

References Cited in the file of this patent

UNITED STATES PATENTS

| Number | Name | Date |
| --- | --- | --- |
| 1,365,198 | Sessions | Jan. 11, 1921 |
| 1,623,249 | Kahn | Apr. 5, 1927 |
| 1,915,082 | Blakeslee | June 20, 1933 |
| 2,009,685 | Caputo | July 30, 1935 |
| 2,179,802 | Sykes | Nov. 14, 1939 |
| 2,205,425 | Leonard | June 25, 1940 |
| 2,237,309 | McMinn | Apr. 8, 1941 |

FOREIGN PATENTS

| Number | Country | Date |
| --- | --- | --- |
| 377,655 | Great Britain | Jan. 21, 1931 |